(12) United States Patent
D'Acquisto

(10) Patent No.: US 7,882,931 B2
(45) Date of Patent: Feb. 8, 2011

(54) OFFSET TREESTAND MOUNTING BRACKET

(75) Inventor: Andrae T. D'Acquisto, Milwaukee, WI (US)

(73) Assignee: Oak Leaf Outdoors, Inc., Brimfield, IL (US)

( * ) Notice: Subject to any disclaimer, the term of this patent is extended or adjusted under 35 U.S.C. 154(b) by 1030 days.

(21) Appl. No.: 11/321,007

(22) Filed: Dec. 29, 2005

(65) Prior Publication Data
US 2007/0151803 A1 Jul. 5, 2007

(51) Int. Cl.
*E04G 5/06* (2006.01)

(52) U.S. Cl. ............. 182/187; 182/188; 248/200; 248/219.1

(58) Field of Classification Search ........... 182/187, 182/188; 248/200, 219.1, 219.3, 219.4; 47/42, 43, 44, 46, 47
See application file for complete search history.

(56) References Cited

U.S. PATENT DOCUMENTS

| | | | | |
|---|---|---|---|---|
| 1,090,836 A | * | 3/1914 | Bush | 182/188 |
| 1,915,715 A | * | 6/1933 | Bodendieck | 182/188 |
| 2,808,975 A | * | 10/1957 | Palmquist | 182/107 |
| 2,941,767 A | * | 6/1960 | Mogey | 248/538 |
| 3,239,183 A | * | 3/1966 | Price et al. | 248/218.4 |
| 3,336,999 A | * | 8/1967 | McSwain | 182/20 |
| 3,493,080 A | * | 2/1970 | Ehlert et al. | 182/187 |
| 3,715,012 A | * | 2/1973 | Perry | 182/107 |
| 4,027,742 A | * | 6/1977 | House, Jr. | 182/92 |
| 4,379,498 A | * | 4/1983 | Krusmark | 182/107 |
| D270,951 S | * | 10/1983 | Cryar | D25/62 |
| 4,549,635 A | * | 10/1985 | Early | 182/187 |
| 4,819,763 A | * | 4/1989 | Grote | 182/187 |
| 4,844,207 A | * | 7/1989 | Andrews et al. | 182/151 |
| 5,052,516 A | * | 10/1991 | Jamieson | 182/135 |
| 5,060,756 A | | 10/1991 | D'Acquisto | 187/187 |
| 5,199,527 A | | 4/1993 | Jennings | 182/187 |
| 5,205,375 A | | 4/1993 | Shriver | 182/187 |
| 5,226,505 A | * | 7/1993 | Woller et al. | 182/187 |
| 5,316,104 A | | 5/1994 | Amacker | 182/187 |
| 5,363,941 A | * | 11/1994 | Richard | 182/187 |
| 5,655,623 A | * | 8/1997 | Skyba | 182/116 |
| 5,752,580 A | * | 5/1998 | Jenkins, Jr. | 182/100 |
| 5,848,666 A | | 12/1998 | Woodall et al. | 182/187 |
| 5,850,894 A | * | 12/1998 | Busenhart | 182/214 |
| 5,868,221 A | | 2/1999 | Brack, Jr. | 182/116 |
| 5,927,437 A | | 7/1999 | Fast | 182/187 |
| 5,954,158 A | | 9/1999 | Concepcion | 182/187 |
| 6,053,282 A | | 4/2000 | Morisak | 182/187 |
| 6,085,868 A | | 7/2000 | Anthony et al. | 182/127 |
| 6,196,354 B1 | | 3/2001 | Anthony et al. | 182/187 |
| 6,345,690 B1 | | 2/2002 | Morris | 182/136 |
| 6,354,400 B1 | * | 3/2002 | Purkayastha | 182/107 |
| 6,367,585 B1 | | 4/2002 | Fast | 182/187 |
| 6,510,922 B1 | * | 1/2003 | Hodnett | 182/187 |
| 6,571,916 B1 | * | 6/2003 | Swanson | 182/187 |
| 6,595,325 B2 | | 7/2003 | Ulrich | 182/136 |

(Continued)

*Primary Examiner*—Katherine W Mitchell
*Assistant Examiner*—Colleen M Quinn
(74) *Attorney, Agent, or Firm*—Warner Norcross & Judd LLP

(57) ABSTRACT

The present invention generally relates to an offset treestand stabilizing bracket and to a treestand employing same. The treestand stabilizing bracket of the invention greatly enhances the safety of the treestand by minimizing the slipping and/or shifting of same during usage, especially when attached to trees that are crooked and/or not vertical.

19 Claims, 3 Drawing Sheets

U.S. PATENT DOCUMENTS

| | | | |
|---|---|---|---|
| 6,698,546 B1 * | 3/2004 | Sandor, Sr. | 182/107 |
| 6,729,441 B1 * | 5/2004 | Nahlen | 182/206 |
| 6,739,428 B1 | 5/2004 | Holmes et al. | 182/127 |
| 7,174,995 B1 * | 2/2007 | Alexander | 182/187 |

* cited by examiner

OFFSET TREESTAND MOUNTING BRACKET

FIELD OF THE INVENTION

The present invention generally relates to an offset treestand mounting bracket and to a treestand employing same.

BACKGROUND OF THE INVENTION

Treestands are well known to hunters and other outdoor enthusiasts as providing a platform for increased field of vision and for lessening the likelihood of alerting the wildlife being observed. One group of treestand of growing popularity is referred to as portable treestand. Portable treestands for hunting are demountably attached to a tree trunk to provide an improved vantage point. Such treestands are available in an extremely wide variety of types, providing a myriad of sizes, shapes, materials of construction, mounting mechanisms and other features. Key among the important features to be considered by a hunter in choosing a treestand are weight, simplicity of construction and use, and above all, safety.

Fixed-position and some other types of stands usually have a platform which includes structure for engaging the tree, such as bar, toothed member or V-shaped yoke, and a supporting member from which the stand hangs or is otherwise supported. The supporting structure for these stands is typically a strap, brace or other device which attaches to or around the tree and extends downwardly to support the platform. The user stands on the platform and his or her weight is supported by the supporting structure.

Unfortunately, treestands sometime slip, shift or loosen, which may cause the user to fall during use as the user shifts his or her weight. This problem is most acute when the user moves to the portion of the platform most proximate the tree, and/or when the treestand is affixed to a tree that may not have a straight and uniform trunk. In such situations, the user's weight may overcome the forces which hold the tree-engaging portion and the supporting structure to the tree. Due to the number of hunting accidents related to treestand use, there is a need for a more stable treestand having a reduced likelihood shifting and/or slipping during usage.

SUMMARY OF THE INVENTION

The present invention generally relates to an offset treestand mounting bracket and to a treestand employing same. The offset treestand mounting bracket of the invention is designed to straighten out otherwise crooked trees, greatly enhancing the safety of the treestand by minimizing the slipping and/or shifting of same during usage.

DETAILED DESCRIPTION OF THE INVENTION

The present invention generally relates to an offset treestand mounting bracket and to a treestand employing same. The offset treestand bracket of the invention comprises at least two engagement areas that comprise a total of at least three contact points for engaging a tree. The offset bracket of the invention assures at least two solid contact points with a tree, keeping the platform level and straight even when the tree isn't, thereby greatly enhancing the safety of the treestand.

The offset treestand mounting bracket of the invention functions by a structure that is surprisingly simple, compact and easy to use. Moreover, the preferred embodiment of the offset bracket hereof is adaptable for use with a wide variety of commercially available tree stands and requires minimal or no retrofitting or modification thereof for use. Alternatively, the offset bracket of the present invention could be permanently attached to a treestand as it is originally manufactured. Finally, a treestand equipped with the offset treestand bracket hereof may be anchored to the tree without injury to the trunk or any other portion thereof.

The offset treestand bracket of the invention includes a main frame or anchor portion having multiple contact points for contacting and engaging a tree and an attachment means for mounting the offset bracket to the platform or frame member of the treestand. The treestand then contains attachment means for attaching the treestand to a tree securely, whereby upon attachment to said tree, at least two of the contact points of said offset bracket fully and securely engage the tree providing a secure and stable platform for the sportsman. The offset mounting bracket of the invention is ideally suited for treestands that are demountably attached to the trunk of a tree, wherein said trunk is crooked and does not present a perfectly vertical surface for mounting a treestand. In such situations, the mounting bracket of the invention allows for the secure mounting of a treestand in an essentially horizontal position, even when the trunk of the tree to which the stand is mounted deviates substantially from the vertical plane.

DETAILED DESCRIPTION OF THE PREFERRED EMBODIMENT

Figure 1:
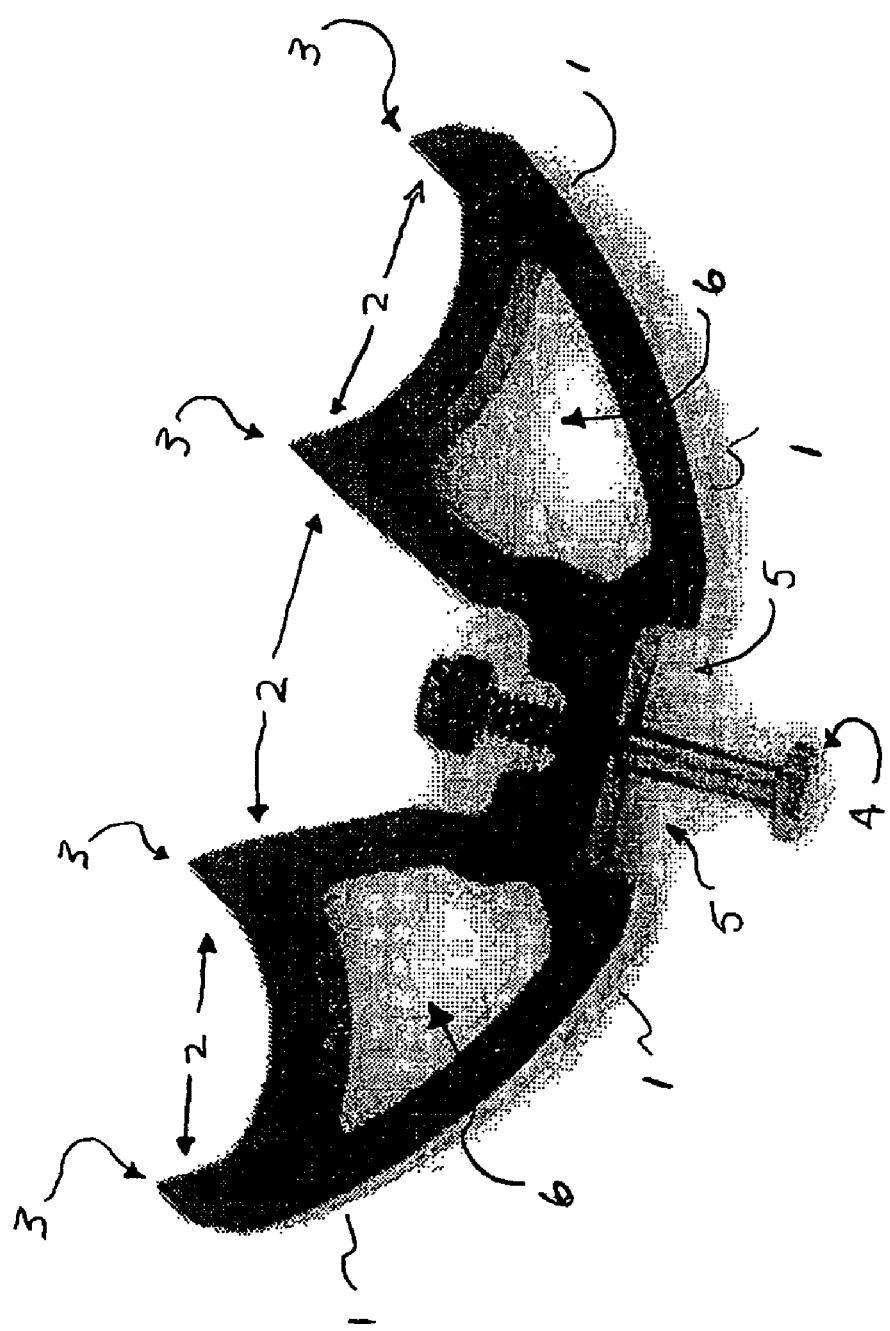
FIG. 1 is a perspective view of the offset treestand bracket of the present invention.

Referring initially to FIG. 1 the offset bracket of the invention includes an frame or anchor portion 1 having multiple engagement areas 2 wherein each engagement area 2 contains at least two offset contact points 2 for contacting and engaging a tree, and an attachment means 4 for mounting the offset bracket 1 to the platform or center rigid post or posts of a typical treestand assembly. The bracket typically has a recess area 5 through which the attachment means passes, said recess area 5 specially adapted to accept the center rigid post element of a typical treestand assembly. The bracket can be of solid construction, or can have openings 6, and can be constructed of various materials including, but not limited to steel, plastic, various metal alloys, carbon composites, metal castings, and the like. In a preferred embodiment, the offset bracket of the invention comprises an aluminum extrusion.

Figure 2:
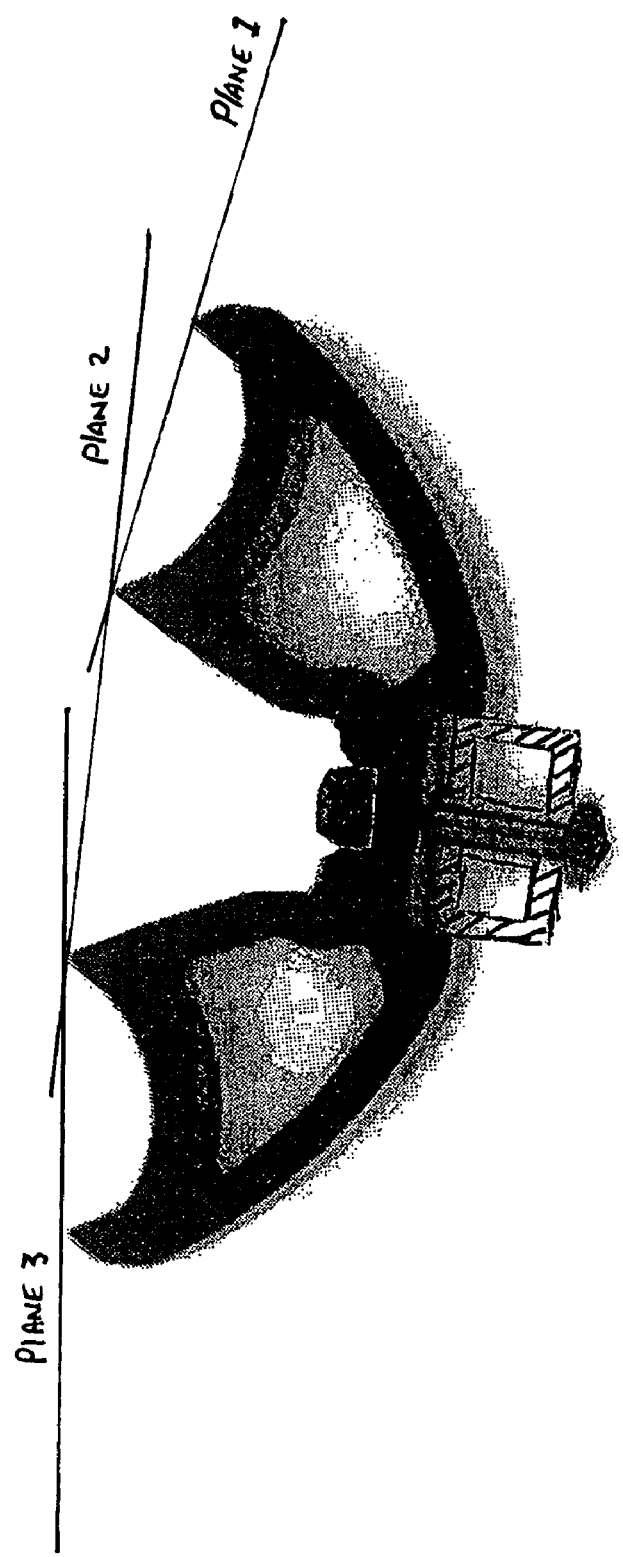
FIG. 2 is a view of the offset treestand bracket of the present invention attached to a center rigid post of a typical treestand assembly.

FIG. 2 is a view of the offset treestand bracket of the present invention attached to the center rigid post of a typical treestand assembly. More specifically, the recess area 5 is specifically adapted to accept the center rigid post(s) of the treestand assembly, and is secured thereto by the referenced attachment means 4, which is typically a bolt or screw, although welds or other means of attachment can be employed. Said center rigid post (or posts) of a typical treestand assembly is typically tubular, rectangular, or approximately square in structure. Regardless of the geometric shape of the center rigid post (s), the recess area 5 of the offset bracket can be specially adapted to accept the center post(s) of the treestand in question. FIG. 2 also shows the offset bracket of the invention having three distinct engagement areas having 2 contact points each, wherein the contact points of each engagement area lie in the same plane. It is also evident that the offset bracket of FIG. 2 has three engagement areas each lying in different plane.

Figure 3:
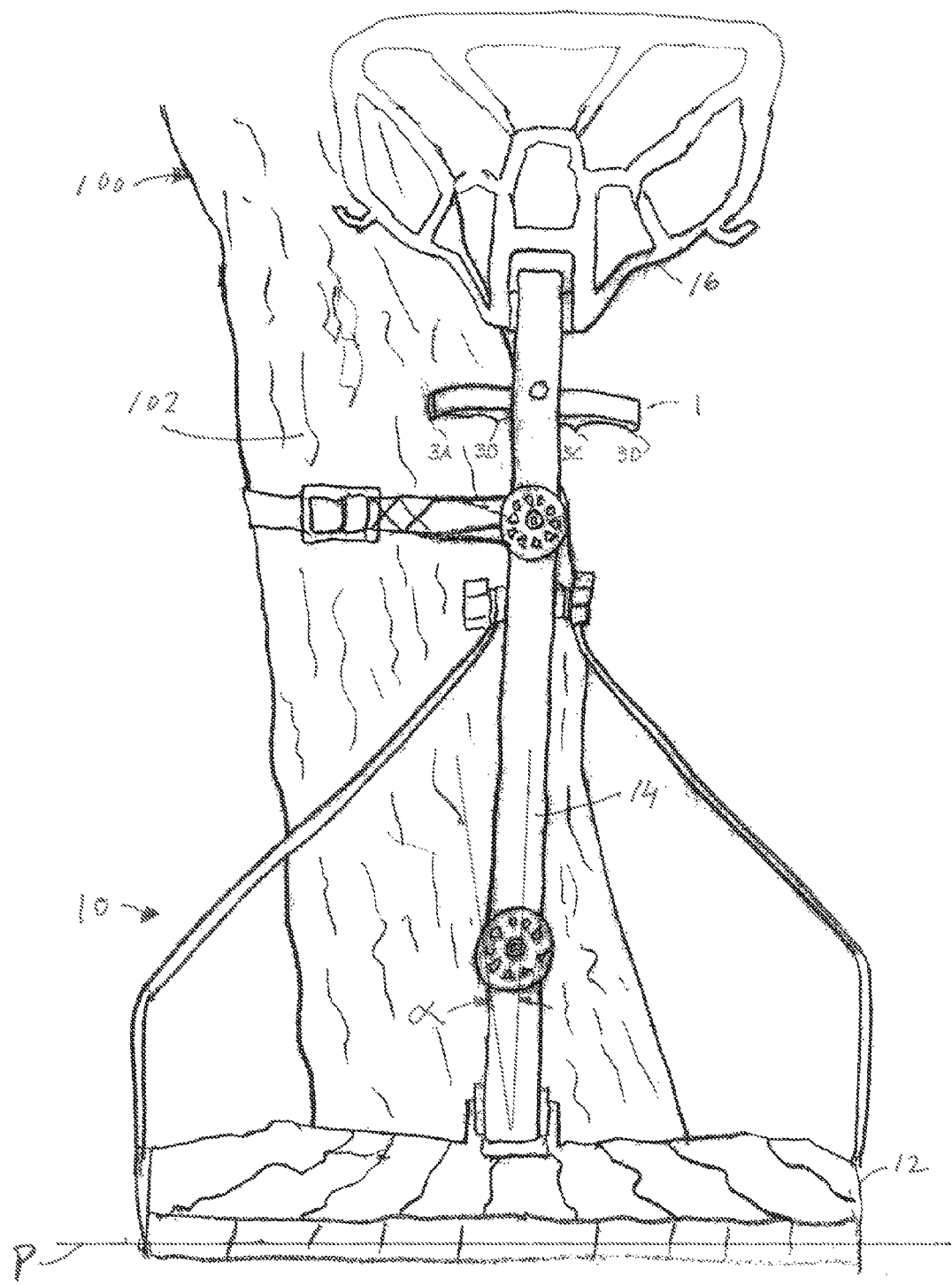
FIG. 3 is a view of a treestand with offset bracket attached to a tree.

FIG. 3 is a view of a treestand 10 with offset bracket 1 attached to a tree 100. The treestand 10 typically includes a supporting platform rigid construction. The platform 12 is typically made of strong lightweight materials, such as structural aluminum. A popular assembly includes a platform supporting framework made out of structural aluminum or steel. The supporting framework is then covered with a thin rigid layer of floor material including, but not limited to sheets of wood, plastic and/or expanded metal grids.

An especially preferred platform is cast from aluminum.

The platform may be used in a wide variety of treestand constructions. The treestand shown in FIG. 3 is a non-climbing type, but the platform 12 is adaptable for use in so called "climbing" treestands which may be moved, by the action of the hunter standing or sitting thereon, upwardly along the trunk of a tree to a final desired position. The platform 12 of the treestand 10 is attached adjacent to its inner edge by a lower hinged connection to a rigid center post 14. Alternatively, the treestand in question may have more than one rigid post 14, and the bracket 1 of the invention can be adapted to fit dual or multiple posts, if necessary. Alternatively, more than one bracket can be employed, i.e., one for each rigid post of the treestand in question. A seat 16 is attached by upper hinged connection to the upper end of the center post 14. The seat 16 may be constructed similarly to the platform, but of a substantially smaller size.

As shown in FIG. 3, a pair of contact points 3A and 3B of bracket 1 are selectively engaged with a tree portion 102. The elongated post 14 can be offset at an angle α, or generally non-parallel to the tree portion, which as shown is non-vertical; and the platform 12 can be generally in a horizontal plane P. Where the tree portion 102 is vertical, a user can mount the treestand 10 so that a pair of contact points 3B and 3C are selectively engaged with the tree portion 102. The platform 12 can be generally horizontal, and the elongated post 14 can be generally aligned with the tree portion 102. Likewise, if the tree portion 102 was of another non-vertical configuration, a user can mount the treestand 10 with the contact points 3C and 3D selectively engaging the tree portion to achieve a similar leveling effect.

In a preferred embodiment the seat also comprises an aluminum casting.

The primary mounting attachment for the treestand comprises an attachment means 18, preferably a rope, strap, chain and/or cable, attached at one end to the seat 16 adjacent the upper hinged connection and/or the center/supporting posts 14 of the treestand 10 and extending around the tree trunk to a similar attachment at its other end adjacent the opposite side of the upper hinged connection. The inner edge of the seat 16 includes the improved offset mounting bracket of the invention which is provided having at least two areas for attachment to said tree, wherein each such area has at least two points for contacting or engaging said tree, and is positioned such that when attached to a tree, downward movement of the treestand, i.e., by pulling down on the treestand, puts the attachment means in tension, and causes the said at least two engagement points of the bracket of the invention to securely engage and/or to bite into the tree. In addition, or alternatively, the offset bracket 1 is positioned such that the downward movement of the seat and/or platform from an initial vertical position against the tree trunk, puts tension in the rope or attachment means and causes at least two contact points of the offset bracket to securely engage or bite into the tree, thereby providing for secure attachment to said tree.

The main supporting platform is maintained in a generally horizontal position with a pair of supporting elements, typically, steel or cable supports, each of which is connected by its upper end to the center post just below the upper hinged connection and by its lower end to the lateral edge of the platform at a point outwardly from the tree trunk. The inner edge of the platform is typically provided with a large V-shaped notch which is also provided with teeth on its tree-engaging face to help hold the treestand securely in position once the rope connection has been securely locked around the tree trunk. Alternatively, the V-shaped notch of the platform can be replaced with the offset bracket of the present invention.

In one embodiment, the offset treestand bracket of the invention comprises at least three offset contact points for contacting and securely engaging said tree, wherein said at least three contact points define two engagement areas on said bracket. Regarding this embodiment, the center offset contact point lies in the same plane with either (but not both) the contact point to the left, or the contact point to the right of said center contact point. In other words, each engagement area contains at least two contact points in the same plane.

In another embodiment, the offset treestand bracket of the invention comprises at least four offset contact points that define three engagement areas of said offset bracket. In this embodiment, each engagement area has at least two contact points in the same plane.

In still another embodiment the offset treestand bracket of the invention comprises a first pair of contact points and a second pair of contact points for contacting and securely engaging a tree, wherein said first and second pair of contact points share at least one contact point. Alternatively, the bracket comprises a third pair of contact points, wherein said third pair of contact points and one of said first and second pair of contact points share at least one contact point. Each pair of contact points defines one engagement area, wherein each engagement area has two contact points in the same plane.

The invention also contemplates various treestands containing the bracket of the invention.

Various modes of carrying out the present invention are contemplated as being within the scope of the following claims particularly pointing out and distinctly claiming the subject matter which is regarded as the invention.

I claim:

1. An offset treestand bracket for securely attaching a treestand to a tree comprising:
   at least three offset contact points being capable of contacting and securely engaging said tree,
   wherein said at least three contact points define a first engagement area and a second engagement area on said bracket,
   wherein the first engagement area includes at least two contact points in a first plane having a first side that is adapted to face the tree,
   wherein the second engagement area includes at least two contact points in a second plane, the second plane including a second side that is adapted to face the tree, the first side of the first plane offset from said second side of said second plane by an obtuse angle, being greater than 180°,
   wherein at least two of the contact points are pointed so that the at least two contact points are capable of engaging and biting into a tree to which the bracket is joined, thereby providing secure attachment to the tree,
   wherein the first engagement area is adapted for selective engagement with a vertical tree, wherein the second engagement area is adapted for selective engagement with a non-vertical tree, wherein either the first engagement area or the second engagement area of the bracket is capable of selectively engaging vertical or non-vertical trees.

2. The offset bracket of claim 1 comprising at least four offset contact points.

3. The offset bracket of claim 2 wherein said at least four offset contact points define three different engagement areas of said offset bracket, the areas being located in three different planes, wherein each of the three engagement areas are capable of separately engaging vertical or non-vertical trees.

4. A treestand for demountable attachment to a tree portion, the treestand comprising:

a main support platform adapted to support a person standing on the platform, and an offset treestand bracket including:

a first pair of contact points in a first plane capable of contacting and securely engaging a tree, the first plane including a first side adapted to face the tree; and a second pair of contact points in a second plane capable of contacting and securely engaging a tree, the second plane include a second side adapted to face the tree, wherein said first and second pair of contact points share at least one shared contact point, wherein the first and second plane differ from one another and define an obtuse angle between the first and second sides of the respective first and second planes, the obtuse angle being greater than 180°, wherein either the first pair of contact points or the second pair of contact points are capable of selectively engaging vertical or non-vertical tree portions, to level the main support platform in a generally horizontal plane.

5. The bracket of claim 4 comprising a third pair of contact points, wherein said third pair of contact points and one of said first and second pair of contact points share at least one contact point.

6. The treestand of claim 4 wherein said main supporting platform is made of cast metal at least approximately as light and strong as aluminum, said platform capable of extending horizontally outward from a tree portion; and an attachment element joined with said platform capable of encircling and attaching said platform to the tree portion.

7. The treestand of claim 4 comprising an elongated post joined with the platform, the elongated post capable of being offset at an angle relative to a non-vertical tree portion when the second pair of contact points selectively engages the non-vertical tree portion.

8. A treestand adapted for demountable attachment to a tree portion, the treestand comprising:

an elongated post;

a main support platform adapted to be placed adjacent the tree portion, the main support platform joined with the elongated post;

a bracket joined with at least one of the elongated post and the main support platform;

wherein the bracket includes a pair of inner contact points laying in a first plane, the pair of inner contact points adapted for selective engagement with the tree portion to hold the platform generally horizontal when the tree portion is vertical, the first plane having a forward side adapted to face away from the tree portion and a rearward side adapted to face toward the tree portion, wherein the bracket includes a first contact point located to at least one of the left and the right of the pair of inner contact points, the first contact point being forwardly disposed relative to the forward side of the first plane, wherein the first contact point and one contact point from the pair of inner contact points lay in a second plane different from the first plane, wherein the first contact point and the one contact point from the pair of inner contact points are capable of selectively engaging a tree portion of a first non-vertical configuration to hold the platform generally horizontal, wherein the elongated post is capable of being offset at an angle relative to the tree portion of the first non-vertical configuration when the first contact point and the one contact point from the pair of inner contact points selectively engages the tree portion to hold the platform generally horizontal, wherein at least two points of the pair of inner contact points and the first contact point are capable of selectively engaging the tree portion to hold the platform generally horizontal when the treestand is mounted to the tree portion.

9. The treestand of claim 8 comprising a seat joined with the elongated post distal from the platform.

10. The treestand of claim 8 wherein each of the pair of inner contact points and the first contact points are pointed and capable of selectively engaging and biting into the tree portion.

11. The treestand of claim 8 wherein the first contact point is located laterally to the right of the pair of inner contact points, wherein a second contact point is located laterally to the left of the pair of inner contact points so that the first and second contact points are located on opposing sides of the pair of inner contact points.

12. The treestand of claim 11 wherein the second contact point is forwardly disposed relative to the first plane away from the tree portion so that the second contact point and another contact point from the pair of inner contact points form a third plane, different from the first plane and the second plane, wherein the second contact point and the other contact point from the inner pair of contact points are capable of selectively engaging a second different non-vertical tree portion to hold the platform generally horizontal.

13. The treestand of claim 12 wherein the first and second contact points, and the inner pair of contact points are pointed and capable of engaging and biting into the tree portion.

14. The treestand of claim 13 wherein the bracket includes four contact points, wherein the four contact points are the pair of inner contact points, the first contact point, and second contact point.

15. The treestand of claim 4 wherein the first pair of contact points and the second pair of contact points are capable of engaging and biting into the tree portion.

16. The treestand of claim 4 comprising an elongated post joined with the platform and projecting vertically therefrom, wherein the elongated post is capable of being offset an angle from the non-vertical tree portion.

17. The treestand of claim 5 comprising a third pair of contact points, the first and third pair of contact points sharing a common contact point, wherein the first, second and third pairs of contact points form different respective planes.

18. The treestand of claim 4 wherein the second pair of contact points are capable of selectively engaging the non-vertical tree portion to level the platform in a generally horizontal plane.

19. The treestand of claim 4 wherein the first pair of contact points are capable of selectively engaging the vertical tree portion to level the platform in a generally horizontal plane.

* * * * *